United States Patent
Doyle

(10) Patent No.: US 6,738,069 B2
(45) Date of Patent: May 18, 2004

(54) EFFICIENT GRAPHICS STATE MANAGEMENT FOR ZONE RENDERING

(75) Inventor: Peter L. Doyle, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 259 days.

(21) Appl. No.: 10/039,007

(22) Filed: Dec. 31, 2001

(65) Prior Publication Data

US 2003/0122833 A1 Jul. 3, 2003

(51) Int. Cl.[7] .................................................. G09G 5/36
(52) U.S. Cl. ........................................ 345/556; 345/582
(58) Field of Search ................................. 345/501, 530, 345/418, 582, 522, 556, 552, 553, 426; 711/144

(56) References Cited

U.S. PATENT DOCUMENTS

| 6,344,852 B1 | * | 2/2002 | Zhu et al. | 345/418 |
| 6,384,833 B1 | * | 5/2002 | Denneau et al. | 345/522 |
| 6,469,704 B1 | * | 10/2002 | Johnson | 345/553 |
| 6,557,083 B1 | * | 4/2003 | Sperber et al. | 711/144 |
| 6,567,084 B1 | * | 5/2003 | Mang et al. | 345/426 |

FOREIGN PATENT DOCUMENTS

| WO | WO 01/75803 A1 | 10/2001 |
| WO | WO 01/75804 A1 | 10/2001 |
| WO | WO 01/84502 A1 | 11/2001 |

* cited by examiner

Primary Examiner—Kee M. Tung
(74) Attorney, Agent, or Firm—Blakely, Sokoloff, Taylor & Zafman LLP

(57) ABSTRACT

The present invention provides a mechanism to track and manage graphics state with hardware state-binning logic for use with the tile-based zone rendering method of generating graphical images. Only the current values of the dynamic state variables are maintained in hardware. Dynamic includes, but is not limited to, state variables that are considered likely to change between primitives. The set of dynamic state variables is subdivided into subgroups. Each state group is associated with a per-bin array of tracking bits. Whenever a state change is encountered, the tracking bit corresponding to the associated state group is set for all bins. Prior to placing a primitive in a bin, the tracking bits associated with that bin are examined, and the current state corresponding to set tracking bits is inserted in the bin before the primitive. Then the tracking bits for that bin are cleared.

38 Claims, 5 Drawing Sheets

EFFICIENT GRAPHICS STATE MANAGEMENT FOR ZONE RENDERING

BACKGROUND

1. Field

The present invention relates generally to graphics systems and more particularly to graphics-rendering systems.

2. Background Information

Computer graphics systems are commonly used for displaying graphical representations of objects on a two-dimensional video display screen. Current computer graphics systems provide highly detailed representations and are used in a variety of applications. In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional objects to be rendered are defined by a host computer in terms of primitive data. For example, when the primitive is a triangle, the host computer may define the primitive in terms of X, Y and Z coordinates of its vertices, as well as the red, green and blue (R, G and B) color values of each vertex. Additional primitive data may be used in specific applications.

Image rendering is the conversion of a high-level object-based description into a graphical image for display on some display device. For example, an act of image rendering occurs during the conversion of a mathematical model of a three-dimensional object or scene into a bitmap image. Another example of image rendering is converting an HTML document into an image for display on a computer monitor. Typically, a hardware device referred to as a graphics-rendering engine performs these graphics processing tasks. Graphics-rendering engines typically render scenes into a buffer that is subsequently output to the graphical output device, but it is possible for some rendering-engines to write their two-dimensional output directly to the output device. The graphics-rendering engine interpolates the primitive data to compute the display screen pixels that represent the each primitive, and the R, G and B color values of each pixel.

A graphics-rendering system (or subsystem), as used herein, refers to all of the levels of processing between an application program and a graphical output device. A graphics engine can provide for one or more modes of rendering, including zone rendering. Zone rendering attempts to increase overall 3D rendering performance by gaining optimal render cache utilization, thereby reducing pixel color and depth memory read/write bottlenecks. In zone rendering, a screen is subdivided into an array of zones and per-zone instruction bins, used to hold all of the primitive and state setting instructions required to render each sub-image, are generated. Whenever a primitive intersects (or possibly intersects) a zone, that primitive instruction is placed in the bin for that zone. Some primitives will intersect more than one zone, in which case the primitive instruction is replicated in the corresponding bins. This process is continued until the entire scene is sorted into the bins. Following the first pass of building a bin for each zone intersected by a primitive, a second zone-by-zone rendering pass is performed. In particular, the bins for all the zones are rendered to generate the final image.

In order to implement a tile-rendering architecture like zone rendering, the maintenance of the correct graphics-rendering state variables within each image-space zone (i.e. bin) is very important, in that it is required to subsequently render (during the rendering phase) each bin's primitives with the graphics state that existed at the time the primitive was encountered during the binning phase.

One conventional method of associating primitives with their appropriate graphics state would be to separately maintain a copy of all encountered graphics states and associate each primitive with some tag (i.e. index) identifying the specific state to be later used for rendering the primitive. However, the complexity of maintaining a separate state table and the cost (in required memory footprint, latency and bandwidth) of loading complete state sets—possibly between each primitive—can be prohibitive in low-cost and bandwidth-constrained (e.g., integrated) graphics systems.

What is needed therefore is a method, apparatus and system for graphics state management for zone rendering that is less costly and more efficient.

DETAILED DESCRIPTION

Figure 1:
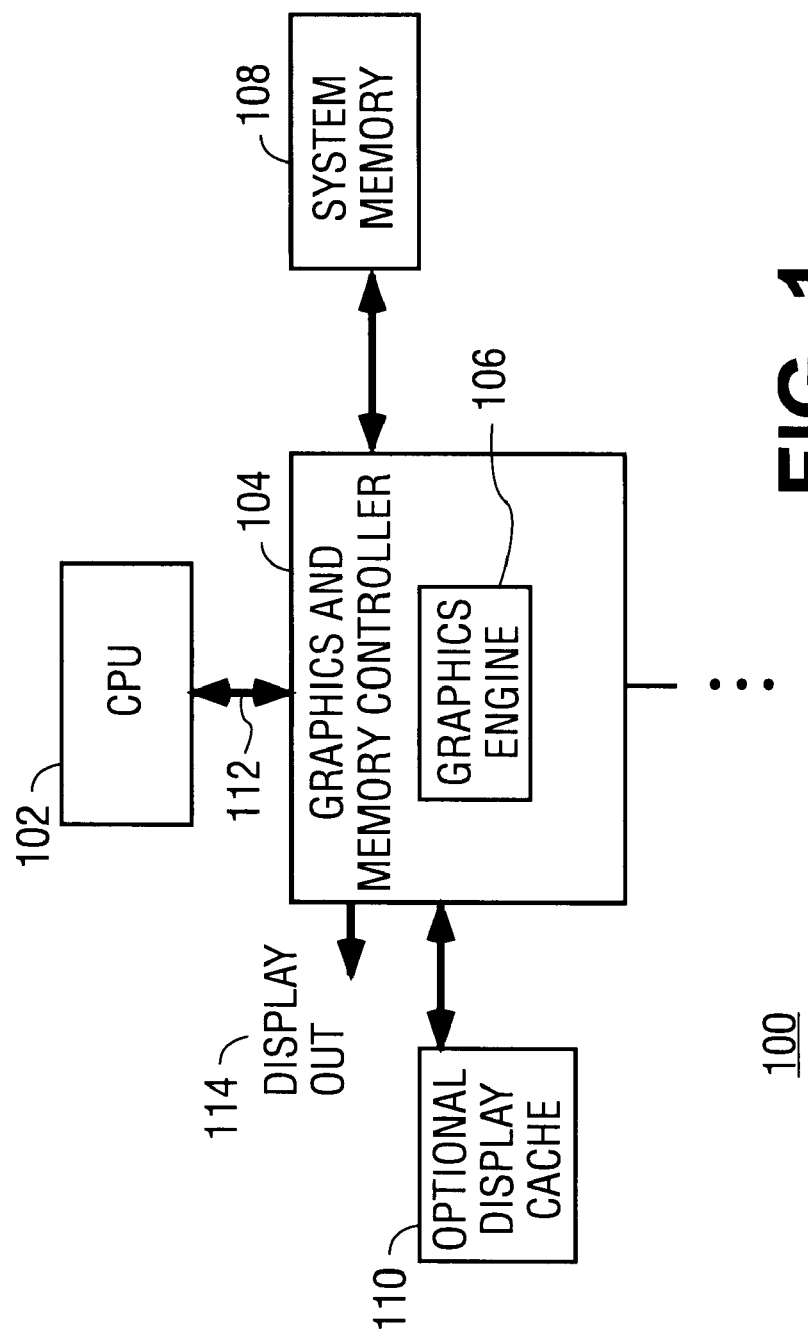
FIG. 1 illustrates a block diagram of an embodiment of a computer system including an embodiment of a graphics device for automatic memory management for zone rendering.

The present invention provides a cost-effective mechanism to track and manage graphics state with hardware state-binning logic for use with the tile-based zone rendering method of generating graphical images. In accordance with an embodiment of the present invention, only the current values of the dynamic state variables are maintained in hardware. In one embodiment, dynamic state variables include, but are not limited to, variables that are considered likely to change between primitives. State variables that remain constant or fairly constant during typical scenes are typically excluded. The set of dynamic state variables is subdivided into subgroups. Each state subgroup is associated with a per-bin array of tracking bits. Whenever a state change is encountered during the binning phase, the tracking bit corresponding to the associated state group is set for all bins. Prior to placing a primitive in a bin, the tracking bits associated with that bin are examined, and the current state corresponding to set tracking bits is inserted in the bin before the primitive. The tracking bits for that bin are then cleared.

As discussed in detail below, the present invention optimizes zone rendering support in that it removes the need to track state changes in the driver software thus increasing performance and reducing driver complexity. The cost of binning state management is minimized by only supporting (a single instanced of) the on-chip storage of dynamic state variables while providing a means to effect changes to any state variable and reducing the on-chip per-bin storage to tracking bits, typically four per bin. In a typical embodiment, the on-chip per-bin storage is reduced to only four tracking bits. Additionally the requirements for state-change bandwidth and footprint are reduced by (a) collapsing back-to-back state changes within a subgroup, (b) eliminating updates of non-required texture blend stage and texture map state data, and (c) providing optimized (and low-latency) instructions for state subgroup changes. Moreover, the cost and complexity of managing indirectly stored state arrays and/or caches are reduced.

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 1. Sample system 100 may be used, for example, to execute the processing for methods in accordance with the present invention, such as the embodiment described herein. Sample system 100 is representative of processing systems based on the microprocessors available from Intel Corporation, although other systems (including personal computers (PCs) having other microprocessors, engineering workstations, set-top boxes and the like) may also be used. In one embodiment, sample system 100 may be executing a version of the WINDOWS.TM. operating system available from Microsoft Corporation, although other operating systems and graphical user interfaces, for example, may also be used.

FIG. 1 is a block diagram of a system 100 of one embodiment of the present invention. The computer system 100 includes central processor 102, graphics and memory controller 104 including graphics device 106, memory 108 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 112 that transmits data signals between processor 102 and other components in the system 100. FIG. 1 is for illustrative purposes only. The present invention can also be utilized in a configuration including a descrete graphics device.

Processor 102 issues signals over common bus 112 for communicating with memory 108 or graphics and memory controller 104 in order to manipulate data as described herein. Processor 102 issues such signals in response to software instructions that it obtains from memory 108. Memory 108 may be a dynamic random access memory (DRAM) device, a static random access memory (SRAM) device, or other memory device. Memory 108 may store instructions and/or data represented by data signals that may be executed by processor 102, graphics device 106 or some other device. The instructions and/or data may comprise code for performing any and/or all of the techniques of the present invention. Memory 108 may also contain software and/or data. An optional cache memory 110 may be used to speed up memory accesses by the graphics device 106 by taking advantage of its locality of access. In some embodiments, graphics device 106 can offload from processor 102 many of the memory-intensive tasks required for rendering an image. Graphics device 106 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics device 106 may be coupled to common bus 112 that transmits data signals between graphics device 106 and other components in the system 100, including render cache 110 and display device 114. Graphics device 106 includes rendering hardware that among other things writes specific attributes (e.g. colors) to specific pixels of display 114 and draw complicated primitives on display device 114. Graphics and memory controller 104 communicates with display device 114 for displaying images rendered or otherwise processed by a graphics controller 104 for displaying images rendered or otherwise processed to a user. Display device 114 may comprise a computer monitor, television set, flat panel display or other suitable display device.

Memory 108 stores a host operating system that may include one or more rendering programs to build the images of graphics primitives for display. System 100 includes graphics device 106, such as a graphics accelerator that uses customized hardware logic device or a co-processor to improve the performance of rendering at least some portion of the graphics primitives otherwise handled by host rendering programs. The host operating system program and its host graphics application program interface (API) control the graphics device 106 through a driver program.

Figure 2:
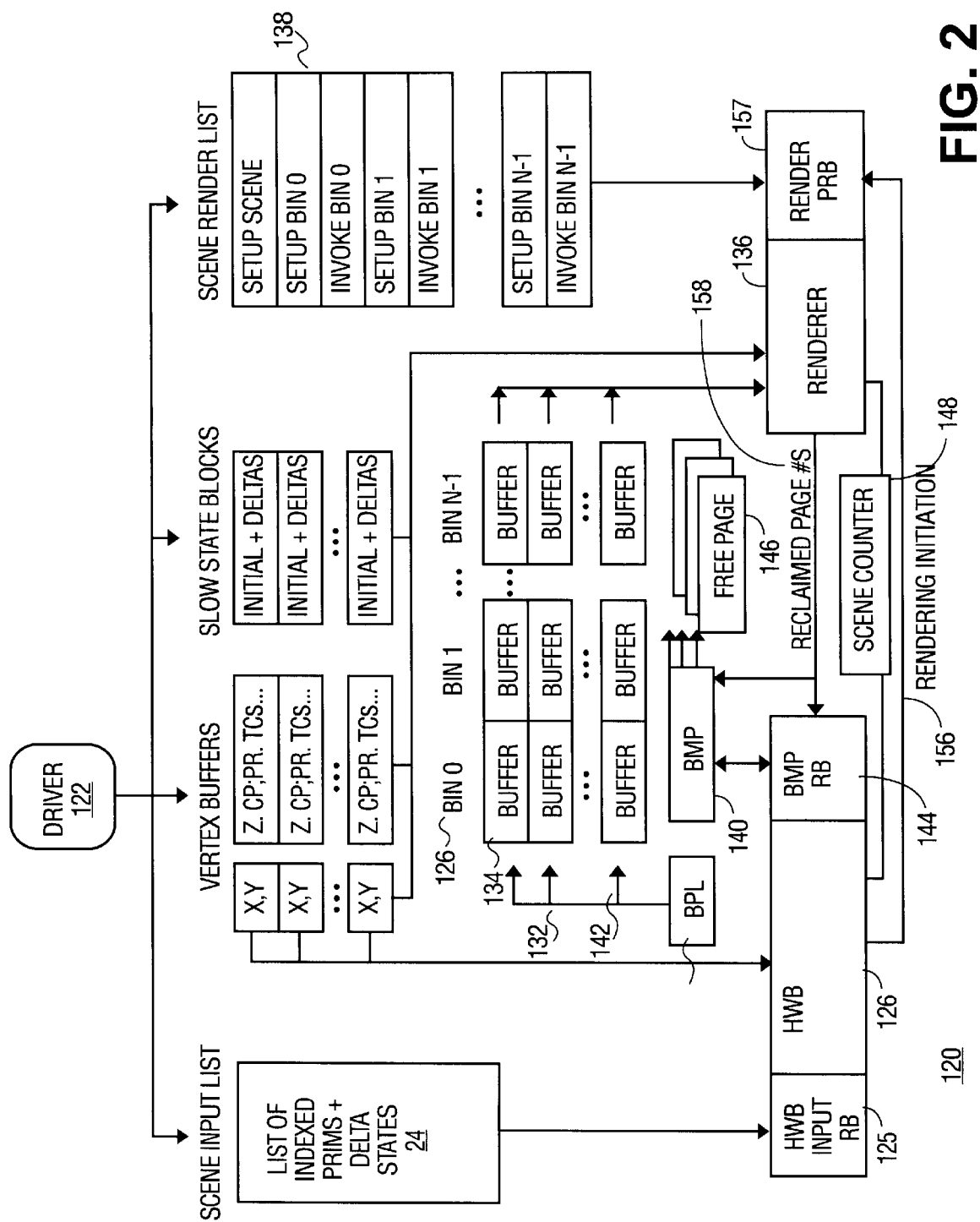
FIG. 2 illustrates a block diagram of an embodiment of a graphics device including a graphics-binning engine for processing a scene input list including delta states, graphics-rendering engine and bins.
Figure 3:
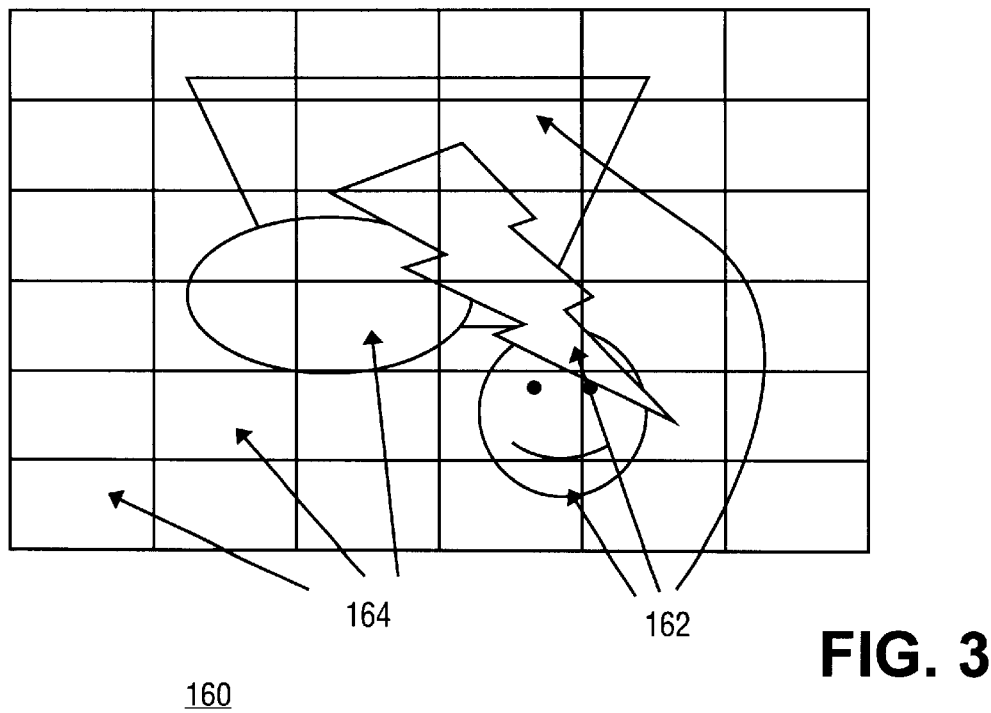
FIG. 3 illustrates a depiction of an embodiment of a zone renderer screen view including zones and geometrical primitives.

Referring to FIGS. 2 and 3, an embodiment 160 of various graphics objects, for example geometric primitives (i.e. triangles, lines) 162, implemented on a zone rendering system 120 is illustrated. In zone rendering, a screen is subdivided into an array of zones 164 commonly screen-space rectangles although other geometric variants may be used as well. Each zone 164 is associated with a bin. Each bin 128 includes a chained series of command buffers 134 stored within non-contiguous physical memory pages. The bins 128 are thus preferably implemented as a chain of independent physical pages.

When a primitive 162 intersects a zone 164, the corresponding primitive instruction is placed in the bin 128 associated with the zone 164 intersected. Per-zone instruction bins 128 are thus used to hold primitive instructions and state setting instructions required to render each sub-image and are generated by comparing the screen-space extent of each primitive 162 to the array of zones 164. Thus, as the primitives 162 are received, the present invention determines which zone(s) 164 each primitive 162 intersects, and replicates the primitive instructions into a bin 128 associated with each of these zones 164. The process of assigning primitives (and their attributes) 142 to zones 164 is referred to as binning. "Bin" 128 refers to the abstract buffer used for each zone—where a bin 128 will typically be realized as a series of instruction batch buffers 134. Binning performs the necessary computations to determine what primitives 162 lie in what zones 164 and can be performed by dedicated hardware and/or software implementations. In one typical implementation, a driver 122 writes out a set of commands to be parsed by the graphics-binning engine 126 for each zone 164 intersected by a primitive 162 and the commands are written into buffers 134 associated with the zones 164 intersected.

Some primitives 162 will intersect more than one zone 164, in which case the primitive instruction is replicated in bins 128 corresponding to the intersected zones 164. For example, the lightening bolt depicted in FIG. 3 intersects nine zones 164. This process is continued until the entire scene is sorted into bins 128.

Once all the primitives 162 are sorted and the command structures completed, a second pass is made to render the scene one zone 164 at a time. Following the first pass of building a bin for each zone 164 intersected by a primitive 162, a second zone-by-zone rendering pass is performed. In particular, the bins 128 for all the zones 164 are rendered to generate the final image, with each scene rendered one zone 164 at a time. The order with which the zones 164 are rendered is not significant. All bins 128 associated with primitives 162 that touch pixels within a particular zone 164 are rendered before the next zone 164 is rendered. A single primitive 162 may intersect many zones 164, thus requiring multiple replications. As a result, primitives 162 that intersect multiple zones 164 are rendered multiple times (i.e. once for each zone 164 intersected).

Rendering performance improves as a result of the primitives 162 being decomposed into zones 164 that are aligned to the render cache 110. Since the graphics device 106 is only working on a small portion of the screen at a time (i.e. a zone 164), it is able to hold the frame buffer contents for the entire zone 164 in a render cache 110. The dimensions of the zone 164 are typically a constant tuned to the size and organization of the render cache 110. It is by this mechanism that the render cache 110 provides optimal benefits-reuse of cached data is maximized by exploiting the spatial coherence of a zone 164. Through use of the zone rendering mode, only the minimum number of color memory writes need be performed to generate the final image one zone 164 at a time, and color memory reads and depth memory reads and writes can be minimized or avoided altogether. Use of the render cache 110 thus significantly reduces the memory traffic and improves performance relative to a conventional renderer that draws each primitive completely before continuing to the next primitive.

Referring to FIG. 2, in a typical implementation, a graphics primitive and state-setting instruction stream, referred to as a scene input list 124, is initially applied to graphics-binning engine ring buffer 125 associated with graphics-binning engine 126. The scene input list 124 may be a single, temporally-ordered scene description (as received by the application programming interface). Graphics-binning engine 126 is typically implemented as a hardware binning engine (HWB) 126. One skilled in the art will recognize that a software or software plus hardware binner could be used as well. The graphics-binning engine 126 parses scene input list 124 and determines which zone(s) 164 each primitive 162 intersects.

Figure 5:
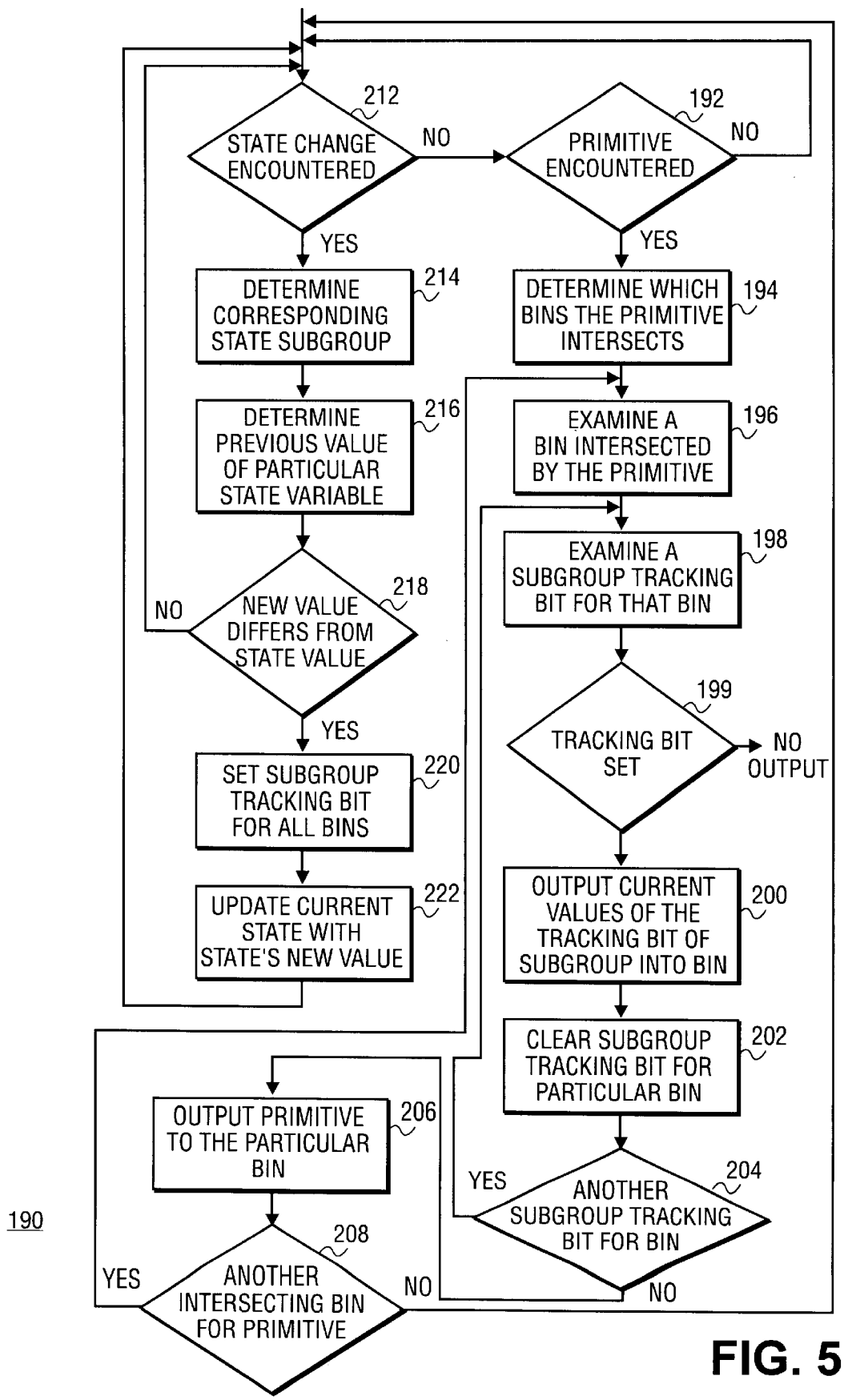
FIG. 5 illustrates a flow diagram of an embodiment of a process for outputting any required state changes prior to placing a primitive in a bin and of a process for using the stored current dynamic state and the per-bin tracking bit vectors to efficiently manage state changes during the scene capture phase of zone rendering.

As previously noted, the zones 164 are associated with bins 128. Graphics-binning engine 126 compares the screen-space extent of each primitive 162 to the array of zones 164, and replicates the associated primitive commands into corresponding bins 128. As shown in FIG. 5 and described in detail below, bins 128 are comprised of chained series of command buffers 134 typically stored within non-contiguous physical memory pages. A bin list is a list of buffers 134 which comprise each bin 132. Pages are initially allocated to the BMP 140. The bin pointer list 130 is initialized with the page numbers of the pages and stores a write pointer into the bin list 132.

The graphics-binning engine 126 also maintains the current graphics state by parsing associated state-setting instructions contained with the scene input list 124. Prior to placing a primitive command in any given bin 128, the graphics-binning engine 126 typically precedes the primitive command in the bin 128 with any required state-setting instructions.

After the scene input list 124 has been completely parsed, the associated bins (i.e. bin 0, bin 1 . . . bin n–1) are ready to be used by the graphics-rendering engine 136 to render the scene. As discussed in detail below, instructions are included at the end of the scene input list 124 to cause the graphics-binning engine 126 to increment the register in pending scene counter 148 by one and initiate rendering of the binned scene. For example, graphics-binning engine 126 sends a render instruction to graphics-rendering engine ring buffer 157 associated with graphics-rendering engine 136 via path 156.

Figure 4:
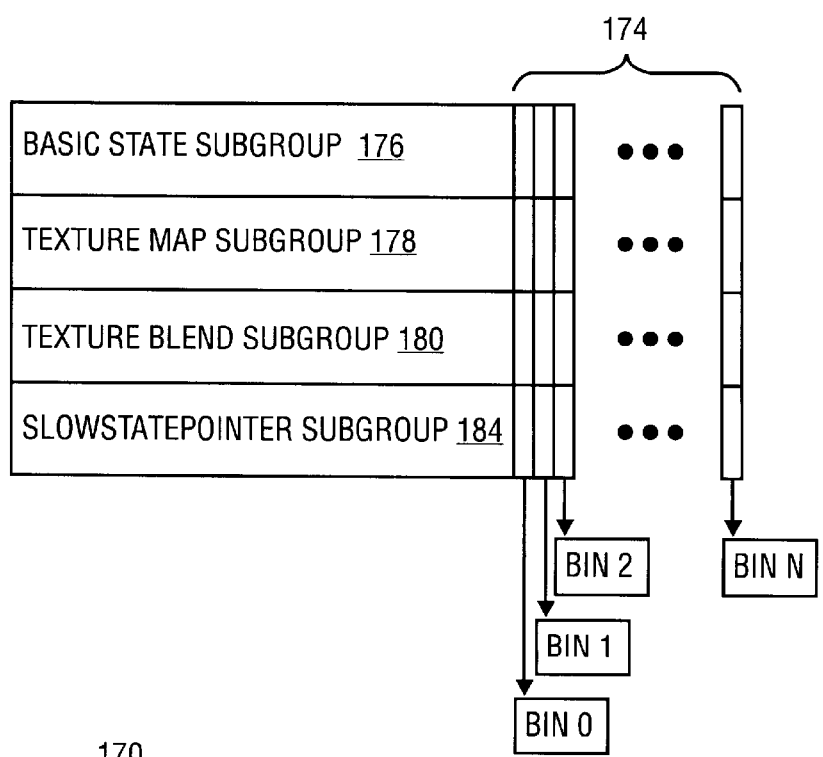
FIG. 4 illustrates a block diagram of an embodiment of dynamic state subgroups and per-bin tracking bits.

FIG. 4 illustrates a block diagram of an embodiment 170 of current dynamic state subgroups 172 and per-bin tracking bits 174. The subdivision of dynamic states into subgroups 172 provides a level of granularity for tracking and effecting changes to the dynamic state variables. In a typical embodiment, the set of dynamic state variables is subdivided into four subgroups 172. One skilled in the art will recognize that four subgroups 172 are advantageous for the configuration shown and discussed herein, however, the present invention can be utilized with any number of subgroups 172 configured any number of ways.

Associated with each bin 128 (e.g. bin 0, bin 1, bin 2 . . . bin n) is a plurality of tracking bits 174, with each bin bit associated with a particular dynamic state subgroup 172. When a tracking bit 174 for a particular bin 128 is "set," it is an indication that some state variable within that subgroup 172 (and for that particular bin 128, e.g., bin n) has changed since the time a primitive 162 was last output to that bin 128. Conversely, a "cleared" tracking bit 174 indicates that the associated dynamic state subgroup 172 for that bin 128 has not changed since the time a primitive 162 was last output to that bin 128. In a typical implementation, a per-bin, 4-bit "tracking bit" vector 174 is used to track changes to the four state groups 172. The "texture map", "texture blend", "basic state" and "slow state" subgroups each typically contain 512 or 1024 bins. With 512 bins, this amounts to 2K bits total (4-bit vector per bin*512 bins). With 1024 bins, this amounts to 4K bits total (4-bit vector per bin*1024 bins).

Initially, all tracking bits 174 are "set" in order to initialize each bin 128 with a complete complement of dynamic state. In particular, prior to placing a primitive 162 in a bin 128, the tracking bits 174 associated with that bin 128 are examined, and the current state corresponding to set tracking bits 174 is inserted in the bin 128 before the primitive 162. Then the tracking bits 174 for that bin 128 are cleared. In a typical embodiment, many of the state bits 174 do not change very often. However, any of the bits 174 that have changed over time must be identified and issued, or a larger group of them issued, to the bin 128 such that the precise state for the triangle can be maintained during rasterization.

In particular, the state groups 172 shown in FIG. 4 include:

(1) "Basic State" Subgroup 176—The state variables associated with the Basic State tracking bit array, include but are not limited to, vertex-buffer, vertex-format, setup, texel stream and pixel pipeline state variables. The state variables are typically arranged into a fixed sequence of words. In one particular embodiment, any change to a basic state variables will require all the words to be issued to the required bins 128 although one skilled in the art will recognize that other configurations may be used as well. In another embodiment, more granular tracking of basic state changes for either all bins 128 or a smaller subset of "open" bins 128 is implemented.

(2) "Texture Map" Subgroup 178—The state variables associated with the Texture Map State tracking bit array, include but are not limited to, most texture map parameters, cube map face enables and texture filter parameters. State variables are output by the graphics-binning engine 126 as part of an instruction. When the Texture Map State tracking bit for a particular bin 128 is found set, the graphics-binning engine 126 will only output the words associated with texture maps that are currently required by the current context settings. The "currently used" maps are determined by the graphics-binning engine 126 by examining the enabled texture blend stages, seeing which texel streams are required as input, and then examining which texture maps are associated with those required texel streams.

(3) "Texture Blend" Subgroup 180—The state variables associated with the Texture Blend State tracking bit array, include but are not limited to, state variables used to control texture map blend stages. In a typical implementation, the state variables include global control and texture blend color, alpha, control stage parameters for controlling one to four texture map blend stage units. These state variables are output by the graphics-binning engine 126 as part of an instruction. When the Texture Blend State tracking bit for a particular bin 128 is found set, the graphics-binning engine 126 will only output those words required by the current setting of the "number of enabled texture blend stages" derived state variable.

(4) "Slow State" Subgroup 182—The state variable associated with the Slow State tracking bit array is a "Slow State Pointer." The Slow State pointer indirectly controls any state pointer not included in the other state subgroups such as the Basic, Texture Blend and Texture Map state subgroups 176, 178 and 180. In a typical embodiment, low-level state change and/or infrequently changing instructions are placed in the slow state buffers 166 and the pointers are only passed into those slow state buffers 166 via an instruction 167.

"Slow state" group contains the remaining non-pipelined (and a few low-frequency pipelined) state variables. Changes to "slow state" state variables are not directly sent to the graphics-binning engine 126. Rather, as shown in FIG. 2, slow state buffers 166 containing initial+delta state changes for these variables are built such that a single pointer into one of these slow state buffers 166 is sufficient to define the current state of all the "slow" state variables. This way, only the slow state pointer needs to be sent to the graphics-binning engine 126. Changes to the slow state pointer will be placed in bins 128 as required, and during rendering will initiate the required reads of the slow state buffers 166 to update slow state variables. The graphics-rendering engine 136 will execute the buffered instructions between the previous and new values of the slow state "pointers," though only if the new value falls between the previous value and the end of the page being rendered. Otherwise the graphics-rendering engine 136 will execute the instructions from the top of the page specified by the new slow state pointer up to but not including the Dword specified by the new slow state pointer. This will thereby set all slow state variables to their initial values and then apply all delta state changes up to but not including the Dword specified by the new slow state pointer.

In particular, the graphics primitive and state-setting instruction stream, referred to as a scene input list 124, is initially applied to graphics-binning engine ring buffer 125 associated with graphics-binning engine 126. The graphics-binning engine 126 parses scene input list 124 and determines which zone(s) 164 each primitive 162 intersects.

The graphics-binning engine 126 maintains the current graphics state by parsing associated state-setting instructions contained with the scene input list 124. Prior to placing a primitive command in any given bin 128, the graphics-binning engine 126 precedes the primitive command in the bin 128 with the state-setting instructions 167.

If the Slow State tracking bit 183 for bin 0 indicates a change, the slow state "pointer" is output to the bin 128. The Slow State tracking bit 183 is then cleared. If the Slow State tracking bit 183 does not indicate a change, the slow state pointer is not output to bin 0.

Slow state buffers 166 store initial and delta state changes for the slow state variables. A single pointer into one of these slow state buffers 166 is sufficient to define the current state of all the "slow" state variables. The slow state buffers 166 may be located in either state memory 108 or a dedicated memory. In a typical embodiment, low-level state changes and/or infrequently changing instructions are placed in the slow state buffers 166 and binner pointers are only passed into those slow state buffers via an instruction 167. Once all the primitives and state instructions including slow state pointers are binned, a second pass is made to render the scene one zone 164 at a time. The bins 128 are rendered to generate the final image, with each scene rendered one zone 164 at a time. During rendering, the graphic rendering engine 136 initiates the required reads of the slow state buffers 166, based upon the binned slow state pointer, to update slow state variables. The graphics-rendering engine 136 will execute the buffered instructions between the previous and new values of the slow state "pointers."

FIG. 5 is a flow diagram illustrating an embodiment 190 for outputting any required state changes prior to placing a primitive instruction associated with a primitive 162 in a bin 128 (steps 192–208) and for examining delta state changes and updating state and per-bin tracking bits 174 (steps 212–222). The optimizations minimize unnecessary state replication.

In particular, prior to placing a primitive instruction in a particular bin 128, the graphics-binning engine 126 ensures that the state for the particular bin 128 is current at least to the point that the primitive 162 can be rendered correctly during the rendering phase. This means that a state that is not currently used does not have to be output prior to outputting the primitive instruction into the bin 128. For example, disabled texture blend state settings and unused texture map settings do not have to be output to the bin 128.

If a primitive 162 is encountered (step 192), the present invention determines which zones 164 the primitive 162 intersects (step 194). For each bin 128 associated with the zone 164 intersected (step 196), each subgroup tracking bit 174 is examined (step 198). If the tracking bit 174 for a particular subgroup is set (step 199), the current values of the particular subgroup 172 are output to the bin 128 (step 200). A tracking bit 174 is considered "set" when a state subgroup 172 associated with the tracking bit 174 becomes "used."

For example, the subgroup tracking bit 177 for the Basic State Subgroup 176 may initially be examined for bin 0. The subgroup tracking bit 174 for that particular bin 128 is then cleared (step 202). Else if the tracking bit for a particular subgroup is not set, no current values of the particular subgroup 172 are output to the bin 128 (step 201).

The next subgroup tracking bit 174 for the bin 128 is then examined and steps 198, 200 and 202 are repeated for each bit 174 in the bin 128 (step 204). For example, the tracking bit 179 for the Texture Map Subgroup 178 for bin 0 may be examined next.

The primitive instructions are output to the bin 128 after all the tracking bits 174 associated with the subgroups 172 have been examined for the particular bin 128 (step 206). The tracking bits 174 of the subgroups 172 for the next bin 128 associated with the zone 164 that is intersected by the primitive 162 is then examined (step 208).

For example, referring to FIG. 4, if a Basic State tracking bit 177 associated with bin 0 indicates a change, the current values of the Basic State Subgroup 176 are output to bin 0. The Basic State tracking bit 177 is then cleared. If the Basic State tracking bit 177 does not indicate a change, no values are output to bin 0.

The tracking bit 174 for the next subgroup 172 is then examined. For example, if the Texture Map State tracking bit 179 for bin 0 indicates a change, the current values of the Texture Map State 178 are output. The Texture Map State tracking bit 179 is then cleared. If the Texture Map State tracking bit 179 does not indicate a change, no values are output to bin 0.

Similarly, if the Texture Blend State tracking bit 181 for bin 0 indicates a change, the current values of the Texture Blend State 180 are output. The Texture Map State tracking bit 181 is then cleared. If the Texture Map State tracking bit 179 does not indicate a change, no values are output to bin 0.

If the Slow State tracking bit 183 for bin 0 indicates a change, the slow state pointer is output to bin 0. The Slow State tracking bit 183 is then cleared. If the Slow State tracking bit 183 does not indicate a change, the slow state pointer is not output to bin 0.

The tracking bit 174 thus eliminates the possibility that a stale resource will be used. For example, if (a) a change is made to a currently unused texture map, (b) a primitive 162 is drawn (clearing the respective texture map tracking bit 179 without outputting the unused state), and (c) a state change is made such that the texture map is now used "as is" (i.e., without a change to the map itself). Without any special handling, the stale texture map would be incorrectly used. In the present invention, the texture map tracking bit 179 is set when a texture map becomes "used" (as a result of a state change to the texture map state) thus eliminating the possibility that a stale resource will be used.

Optimized versions of state-setting graphics instructions are used to independently update each of the dynamic state variable subgroups 172. By including these optimized instructions within the bins 128, the complexity and latency of reading indirect state data is greatly reduced, thus increasing performance while lowering cost. In particular, FIG. 5 illustrates examining delta state changes and updating state and per-bin tracking bits 174 (steps 212–222). The graphics-binning engine 126 prevents unnecessary broadcasting of all state changes to all bins 128 by maintaining and tracking changes to states on a per-bin 128 and per-subgroup 172 basis. The state for a bin 128 is updated advantageously just prior to the primitive instruction being placed in the bin 128. Multiple changes occurring within the same state subgroup 172 between primitive instructions being binned are collapsed into one subgroup change output to the bin 128.

Steps 212–222 are implemented for using the stored current dynamic state and the per-bin tracking bits 174 to efficiently manage state changes during the scene capture phase. By tracking state changes on a per bin 128 and per state group 172 basis, the graphics-binning engine 126 will also only update those state subgroups 172 that have changed for a particular intersected bin 128 since the last time a primitive 162 was placed in that bin 128.

Initially, if a state change is encountered (step 212), the corresponding dynamic state subgroup 172 is determined (step 214). The previous value of the particular state variable is then determined (step 216).

If the state's new value differs from the state's current value (step 218), the corresponding subgroup tracking bit 174 for the bin 128 is set (step 220). The current state with the state's new value is then updated (step 222).

Slow State Pointer

If a state change modifies a "slow state pointer," the Slow State tracking bit (i) for each bin (i) is set. The state changes are applied to the current state for each of the subgroups affected.

Basic State

For example, if a state change modifies a "basic state," the Basic State tracking bit (i) for each bin (i) is set.

Texture Map

If a state change causes any of the texture maps required (0 . . . 3) to become set, the Texture Map State tracking bit (i) for each bin (i) is set. If a state change modifies the texture maps (0 . . . 3), the Texture Map State tracking bit (i) for each bin (i) is set.

Texture Blend

If a state change modifies a required "color factor," the Texture Blend State tracking bit (i) for each bin (i) is set. If a state change increases the number of enabled texture blend stages, the Texture Blend State tracking bit (i) for each bin (i) is set.

Figure 6:
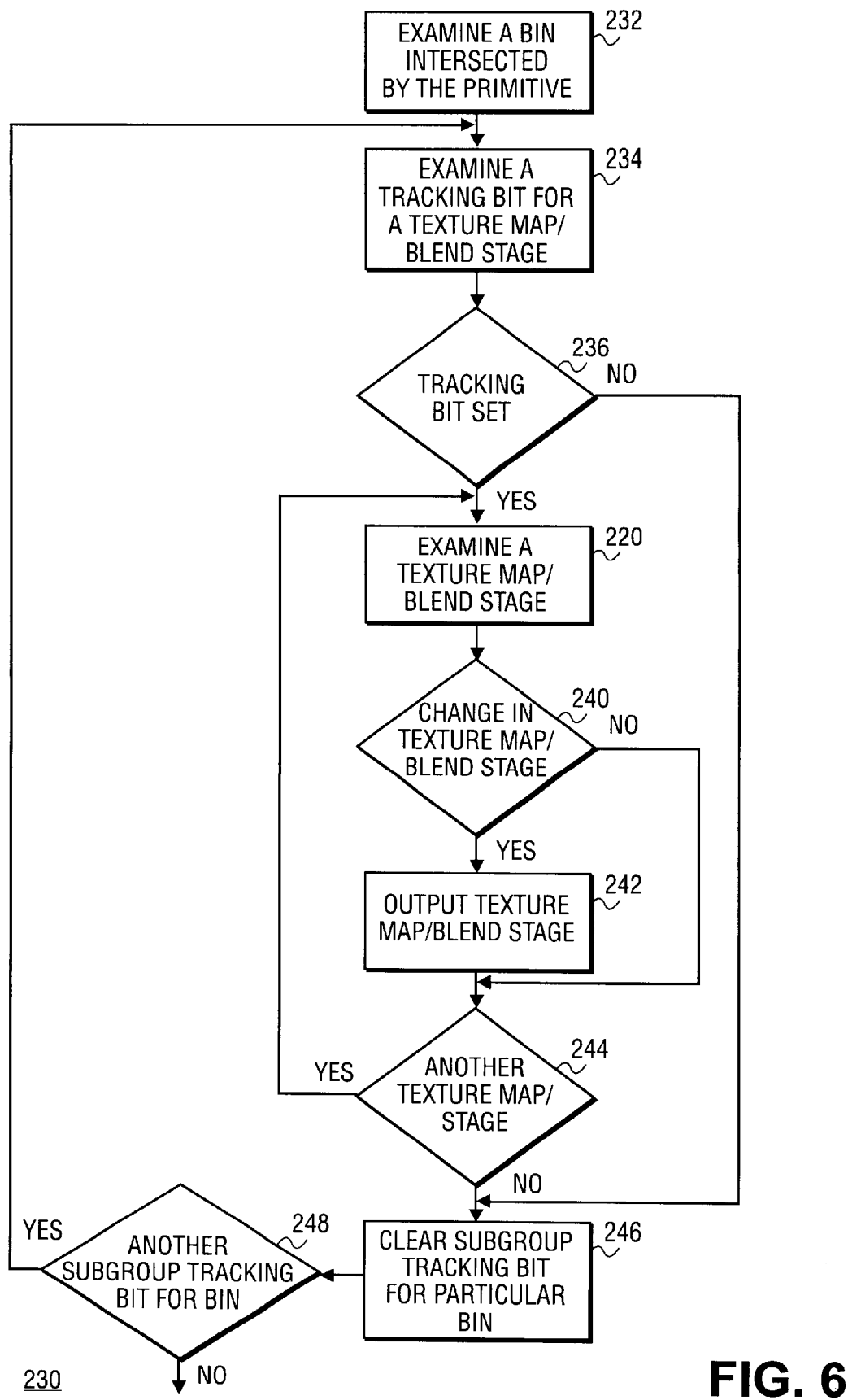
FIG. 6 illustrates a flow diagram of an embodiment of a process for an optimization for detecting which texture maps and texture blend stages are required.

FIG. 6 is a flow diagram illustrating an embodiment 230 of an optimization for specifically detecting which, if any, states associated with a particular texture map or texture blend stage needs to be output to the bin 128. In particular, state information associated with a particular texture map or texture blend stage are only output to the bin 128 when subgroup tracking bits 174 associated with texture map or texture blend states are found set. Only information associated with the used texture map or texture blend stage is output to the bin 128. This prevents stale texture blend or texture map states from being used by ensuring that only the newly required state or map is output to intersecting bins. The subgroup tracking bits 174 are set when (a) a change is made to the state associated with a currently used map/stage, or (b) when a previously unused map/stage becomes "used" via a change to some other state variable. Regarding the latter, for example, a texture blend or texture map becomes "used" as a result of an associated state change (e.g., a basic state change).

For each bin 128 the primitive 162 intersects (step 232), the texture map and/or blend sub group tracking bit 174 associated with that bin 128 is examined (step 234). If the tracking bit 174 is set (step 240), the maps/stages are examined (steps 238–244). If there is a change (step 240) in a texture map/stage, the texture map/stage is output to the bin 128 (step 242). The next texture map/stage is then examined (step 244). For example, if the Texture Blend State tracking bit (i) is set (step 236), then the particular texture blend stage(s) that have changed are output to the bin 128.

In particular, if the texture blend stage 0 changed, the texture blend stage 1 is output. If the texture blend stage 1 changed, the texture blend stage 2 is output. If the texture blend stage 2 has reached it's last stage, the texture blend stage 3 is output and so forth. The Texture Blend State tracking bit is then cleared (step 246).

If the Texture Map State tracking bit (i) is set (step 232), then the particular texture map(s) that have changed are output to the bin 128. In particular, if the texture map [0] is changed, the texture map 0 is output. If the texture map [1] is changed, the texture map 1 is output. If the texture map [2] is changed, the texture map 2 is output. If the texture map [3] is changed, the texture map 3 is output and so forth. The Texture Map State tracking bit is then cleared (step 246).

If a tracking bit 174 does not indicate a change, the primitive 162 is drawn, clearing the respective texture blend stage or texture map/stage tracking bit without outputting the non-required state to the bin 128.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A method for managing state variables for rendering primitives, comprising:

defining a plurality of memory areas for storing instructions and current state information associated with the primitives;

defining state variables associated with the primitives;

sorting state variables into a plurality of subgroups;

associating each of the plurality of memory areas with a plurality of tracking bits, wherein each tracking bit is associated with a subgroup and one of the plurality of memory areas;

setting the tracking bit in response to a change in a state variable since the primitive instructions were previously output to the memory areas; and outputting current state information associated with the subgroup into one of the plurality of memory areas in response to the tracking bit being set.

2. The method of claim 1 further comprising:

clearing the tracking bit after the current state information has been output to the one of the plurality of memory areas.

3. The method of claim 1 wherein sorting state variables into a plurality of subgroups further comprises:

sorting state variables associated with basic state functions.

4. The method of claim 1 wherein sorting state variables into a plurality of subgroups further comprises:

sorting state variables associated with texture map functions.

5. The method of claim 1 wherein sorting state variables into a plurality of subgroups further comprises:

sorting state variables associated with texture blend functions.

6. The method of claim 1 wherein sorting state variables into a plurality of subgroups further comprises:

sorting state variables associated with slow state functions.

7. The method of claim 1 wherein setting the tracking bit in response to a change in a state variable since the primitive instructions were previously output to the memory areas further comprises:

determining whether a state change has occurred;

determining which subgroup is associated with the state change;

determining a new and previous value of the state variable; and setting the corresponding subgroup tracking bit if the new and previous values differ.

8. The method of claim 1 further comprising:

defining a plurality of additional memory areas for storing state information;

defining a reference for the plurality of additional memory areas; and storing selected state group information into the plurality of additional memory areas.

9. The method of claim 8 wherein outputting current state information associated with the subgroup into one of the plurality of memory areas in response to the subgroup being set further comprises:

outputting the reference associated with the subgroup into one of the plurality of memory areas when the tracking bit is set; and based on the reference, retrieving referenced information stored in one of the plurality of additional memory areas during rendering.

10. The method of claim 9 wherein storing selected state group information into the additional memory areas further comprises:

storing state variables associated with slow state functions into the plurality of additional memory areas.

11. The method of claim 10 wherein defining a reference for the additional memory areas further comprises:

defining a pointer to the additional memory areas where slow state information is stored.

12. An apparatus for rendering a scene including primitives, comprising:

a plurality of binning memory areas associated with regions that are intersected by primitives;

a tracking memory area for storing indicators of state variables that been affected since primitive instructions were previously output to the memory areas;

a binning engine, responsive to the tracking indicators, for binning current state information of state variables; and a rendering engine for rendering the current information stored in the memory areas.

13. The apparatus of claim 12 wherein the current information comprises state variables that have changed since primitive instructions were previously output to the memory areas.

14. The apparatus of claim 13 wherein the state variables are associated with at least one state group.

15. The apparatus of claim 14 wherein the at least one state group comprises basic state functions.

16. The apparatus of claim 14 wherein the at least one state group comprises texture map functions.

17. The apparatus of claim 14 wherein the at least one state group comprises texture blend functions.

18. The apparatus of claim 14 wherein the at least one state group comprises slow state functions.

19. The apparatus of claim 12 wherein the current information comprises a reference.

20. The apparatus of claim 19 further comprising:

a plurality of additional memory areas.

21. The apparatus of claim 20 wherein the plurality of additional memory areas stores slow state variables.

22. The apparatus of claim 21 wherein the reference comprises a pointer into the additional memory areas.

23. The apparatus of claim 22 wherein the binning engine, responsive to the tracking indicators, bins the reference in one of the plurality of binning memory areas.

24. The apparatus of claim 23 wherein the rendering engine utilizes the reference to retrieve slow state information from at least one of the plurality of additional memory areas.

25. The apparatus of claim 12 wherein the tracking information comprises a plurality of tracking bits wherein each tracking bit is associated with a binning memory area and a subgroup.

26. The apparatus of claim 12 wherein a tracking memory area for storing indicators of state variables that been affected since primitive instructions were previously output to the memory areas further comprises:

a tracking memory area for storing indicators of state variables that changed since primitive instructions were previously output to the memory areas.

27. The apparatus of claim 12 wherein a tracking memory area for storing indicators of state variables that been affected since primitive instructions were previously output to the memory areas further comprises:

a tracking memory area for storing indicators of state variables that were used since primitive instructions were previously output to the memory areas.

28. A machine readable medium having stored therein a plurality of machine readable instructions executable by a processor to manage states for rendering primitives, the machine readable instructions comprising:

instructions to define a plurality of memory areas for storing instructions and current state information associated with the primitives;

instructions to define state variables associated with the primitives;

instructions to sort state variables into a plurality of subgroups;

instructions to associate each of the plurality of memory areas with a plurality of tracking bits, wherein each tracking bit is associated with a subgroup and one of the plurality of memory areas;

instructions to set the tracking bit in response to a change in a state variable since the primitive instructions were previously output to the memory areas; and instructions to output current state information associated with the subgroup into one of the plurality of memory areas in response to the tracking bit being set.

29. The machine readable medium of claim 28 further comprising:

instructions to clear the tracking bit after the current state information has been output to the one of the plurality of memory areas.

30. The machine readable medium claim 28 wherein instructions to sort state variables into a plurality of subgroups further comprises:

instructions to sort state variables associated with basic state functions.

31. The machine readable medium of claim 28 wherein instructions to sort state variables into a plurality of subgroups further comprises:

instructions to sort state variables associated with texture map functions.

32. The machine readable medium of claim 28 wherein instructions to sort state variables into a plurality of subgroups further comprises:

instructions to sort state variables associated with texture blend functions.

33. The machine readable medium of claim 28 wherein instructions to sort state variables into a plurality of subgroups further comprises:

instructions to sort state variables associated with slow state functions.

34. The machine readable medium of claim 28 wherein instructions to set the tracking bit in response to a change in a state variable since the primitive instructions were previously output to the memory areas further comprises:

instructions to determine whether a state change has occurred;

instructions to determine which subgroup is associated with the state change;

instructions to determine a new and previous value of the state variable; and instructions to set the corresponding subgroup tracking bit if the new and previous values differ.

35. The machine readable medium of claim 28 further comprises:

instructions to define a plurality of additional memory areas for storing state information;

instructions to define a reference for the plurality of additional memory areas; and instructions to store selected state group information into the plurality of additional memory areas.

36. The machine readable medium of claim 35 wherein instructions to output current state information associated with the subgroup into one of the plurality of memory areas in response to the subgroup being set further comprises:

instructions to output the reference associated with the subgroup into one of the plurality of memory areas when the tracking bit is set; and instructions, based on the reference, to retrieve referenced information stored in one of the plurality of additional memory areas during rendering.

37. The machine readable medium of claim 36 wherein instructions to store selected state group information into the additional memory areas further comprises:

instructions to store state variables associated with slow state functions into the plurality of additional memory areas.

38. The machine readable medium of claim 37 wherein instructions to define a reference for the additional memory areas further comprises:

instructions to define a pointer to the additional memory areas where slow state information is stored.

* * * * *